United States Patent
Prokopec et al.

(10) Patent No.: US 12,321,731 B2
(45) Date of Patent: Jun. 3, 2025

(54) PROGRAM EXECUTION USING INTERPROCEDURAL ESCAPE ANALYSIS WITH INLINING

(71) Applicant: Oracle International Corporation, Redwood Shores, CA (US)

(72) Inventors: Aleksandar Prokopec, Zurich (CH); Matthew Weingarten, Redwood Shores, CA (US); Paul Woegerer, Redwood Shores, CA (US); Christian Wimmer, Belmont, AL (US)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 18/313,307

(22) Filed: May 30, 2023

(65) Prior Publication Data

US 2024/0403011 A1 Dec. 5, 2024

(51) Int. Cl.
*G06F 8/41* (2018.01)

(52) U.S. Cl.
CPC ............ *G06F 8/4443* (2013.01); *G06F 8/433* (2013.01)

(58) Field of Classification Search
CPC ................................ G06F 8/433; G06F 8/4443
See application file for complete search history.

(56) References Cited

U.S. PATENT DOCUMENTS

| | | | | |
|---|---|---|---|---|
| 6,865,730 | B1* | 3/2005 | Burke | G06F 9/4491 |
| | | | | 717/157 |
| 10,261,765 | B1* | 4/2019 | Prokopec | G06F 8/443 |
| 2007/0050603 | A1* | 3/2007 | Vorbach | G06F 9/3802 |
| | | | | 711/138 |
| 2015/0113512 | A1* | 4/2015 | Wuerthinger | G06F 9/4552 |
| | | | | 717/139 |
| 2019/0278576 | A1* | 9/2019 | Prokopec | G06F 8/443 |

OTHER PUBLICATIONS

Weingarten et al., "Inlining-Benefit Prediction with Interprocedural Partial Escape Analysis" (Year: 2022).*
Choi et al., "Escape Analysis for Java" (Year: 1999).*
Stadler et al., "Partial Escape Analysis and Scalar Replacement for Java" (Year: 2014).*
Dean, J. et al.; "Towards Better Inlining Decisions Using Inlining Trials"; LFP '94: Proceedings of the 1994 ACM Conference on LISP and Functional Programming; Jul. 1994 pp. 273-282 (10 pages).

(Continued)

*Primary Examiner* — Phillip H Nguyen
(74) *Attorney, Agent, or Firm* — Lathrop GPM LLP (57) ABSTRACT

Improving program execution using interprocedural escape analysis with inlining includes expanding a call graph of a target program to obtain an expanded call graph, performing, using the expanded call graph, an interprocedural escape analysis (IEA) to generate a materialization map, and calculating an inlining benefit value for a callee using the materialization map. Improving program execution further includes inlining, using the expanded call graph and in the target program, the callee according to the inlining benefit value, updating, after inlining the callee, an allocation in the target program, and completing, after updating the allocation, compilation of the target program.

20 Claims, 8 Drawing Sheets

(56) References Cited

OTHER PUBLICATIONS

Kotzmann, T. et al.; "Escape Analysis in the Context of Dynamic Compilation and Deoptimization"; VEE '05: Proceedings of the 1st ACM/USENIX International Conference on Virtual Execution Environments, Jun. 11-12, 2005, Chicago Illinois, USA, pp. 111-120 (10 pages).
Gay, D. et al.; "Fast Escape Analysis and Stack Allocation for Object-Based Programs"; CC/ETAPS 2000; Lecture Notes in Computer Science (LCNS) vol. 1781, pp. 82-93 (12 pages).
Shabalin, D. et al.; "Interflow: Interprocedural Flow-Sensitive Type Inference and Method Duplication"; Scala 2018: Proceedings of the 9th ACM SIGPLAN International Symposium on Scala; Sep. 2018, pp. 61-71 (11 pages).
Stadler, L. et al.; "Partial Escape Analysis and Scalar Replacement for Java"; CGO '14: Proceedings of Annual IEEE/ACM International Symposium on Code Generation and Optimization; Feb. 2014, pp. 165-174 (10 pages).
Choi, J. et al.; "Escape Analysis for Java"; ACM SIGPLAN Notices, vol. 34, No. 10, Oct. 1999, pp. 1-19 (19 pages).
Jones, S.P. et al.; "Secrets of the Glasgow Haskell Compiler Inliner"; Cambridge University Press, JFP 12 (4 & 5), pp. 393-434, Jul. & Sep. 2002 (42 pages).
Shankar, A. et al.; "JOLT: Lightweight Dynamic Analysis and Removal of Object Churn"; ACM SIGPLAN Notices, vol. 43, No. 10, Sep. 2008, pp. 127-142 (15 pages).
Blanchet, B. et al.; "Escape Analysis for Object Oriented Languages: Application to Java"; ACM SIGPLAN Notices, vol. 34, No. 10, Oct. 1999, pp. 20-34 (15 pages).

\* cited by examiner

PROGRAM EXECUTION USING INTERPROCEDURAL ESCAPE ANALYSIS WITH INLINING

BACKGROUND

When a computer program is written, the computer program is written as source code. A compiler is a software program that translates the source code into object code, byte code, or assembly code. Object code or byte code or assembly can be executed directly by a computer processor or a virtual machine. During compilation, the compiler may perform various optimizations. For example, optimizations may reduce the number of instructions executed by a computer processor. By performing the optimizations, the compiler is able to provide more efficient use of the computer processor.

One way to benefit from the information spread across a call graph data structure and to apply additional optimizations to the computer program is to replace the function calls with the respective function bodies, a transformation called inline expansion or inlining. Most compilers rely heavily on inlining, since inlining a function body is fast, enables other optimizations, and does not require a whole-program analysis.

SUMMARY

In general, in one aspect, one or more embodiments relate to a method that includes expanding a call graph of a target program to obtain an expanded call graph, performing, using the expanded call graph, an interprocedural escape analysis (IEA) to generate a materialization map, and calculating an inlining benefit value for a callee using the materialization map. The method further includes inlining, using the expanded call graph and in the target program, the callee according to the inlining benefit value, updating, after inlining the callee, an allocation in the target program, and completing, after updating the allocation, compilation of the target program.

In general, in one aspect, one or more embodiments relate to a system that includes a data repository storing a call graph of a target program, and a computer processor comprising instructions for a compiler to perform operations. The operations include expanding a call graph of a target program to obtain an expanded call graph, performing, using the expanded call graph, an interprocedural escape analysis (IEA) to generate a materialization map, and calculating an inlining benefit value for a callee using the materialization map. The operations further include inlining, using the expanded call graph and in the target program, the callee according to the inlining benefit value, updating, after inlining the callee, an allocation in the target program, and completing, after updating the allocation, compilation of the target program.

In general, in one aspect, one or more embodiments relate to a non-transitory computer readable program medium comprising instructions for causing a computer system to perform operations. The operations include expanding a call graph of a target program to obtain an expanded call graph, performing, using the expanded call graph, an interprocedural escape analysis (IEA) to generate a materialization map, and calculating an inlining benefit value for a callee using the materialization map. The operations further include inlining, using the expanded call graph and in the target program, the callee according to the inlining benefit value, updating, after inlining the callee, an allocation in the target program, and completing, after updating the allocation, compilation of the target program.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In programming languages with dynamic memory allocation, the source code includes instructions that define the allocation of objects. As used in the present application, an object is a memory chunk that is dynamically allocated, such as a record, struct, function instance, or abstract-data-type instance. Allocating an object reserves space in memory to store the object. The space in memory in which all allocations are performed is called heap or heap memory. However, object allocation has costs including calling and executing a subroutine that identifies the location of an object in memory and that allocates the location to the object. Further, when the program is executing, the costs include time to access memory and costs to perform garbage collection so that the program does not run out of memory. Garbage collection deallocates the memory that is allocated to objects based on the objects being no longer used. Thus, object allocation has multiple costs and can cause slower program execution.

To improve program execution of a target program, compiler-level optimization may be performed to delay or even remove allocations. For example, if an object does not escape to another method then memory for the object does not need to be allocated. Further example, the object can be temporarily stored in central processing unit (CPU) registers or stack. The access to the registers or stack memory is also faster than access to heap memory. The operations by a compiler of removing an allocation is called virtualization. An object is virtualized when the object is not allocated in heap memory (i.e., heap memory is not allocated to the object). In some cases, the allocation of the object is delayed to a later point in the program. For example, the delaying of the allocation may be to a point in the program that is less frequently executed. The allocation of a virtualized object is called materializing the object in heap memory. Specifically, when a virtualized object is allocated, the object is materialized.

In general, embodiments are directed to optimizing a target program and thereby improving program execution by combining inlining with interprocedural escape analysis (IEA). Escape analysis determines a dynamic scope of an object. Escape analysis determines when an allocation of an object is defined as compared to when the object "escapes", such as through storage or being used by a different routine. Escape analysis is generally performed to delay or remove allocation of an object until if, or when, an object is materialized. IEA determines, across multiple procedures (e.g., call site boundaries), when an object materializes. Namely, the analysis of whether an object materialized or may remain virtual does not stop at a call site. Rather, the analysis continues across call sites. Combining IEA with inlining uses the information from the IEA to determine whether inlining the callee has a benefit of delaying or removing materializations of objects. After inlining, IEA is performed to delay or remove the materializations.

Further, one or more embodiments use IEA incrementally for call graph exploration. In call-graph exploration, whether the object is determined to materialize only because of being passed to a cutoff node of the call graph is used to determine whether to further expand the call graph at the cutoff node. If the call graph is expanded at the cutoff node, further IEA and additional inlining may be performed to further optimize the target program. Thus, one or more embodiments may explore the call graph during the expansion stage using IEA, then switch to the inlining stage using IEA. The two stages alternate until a termination condition is satisfied.

Figure 1:
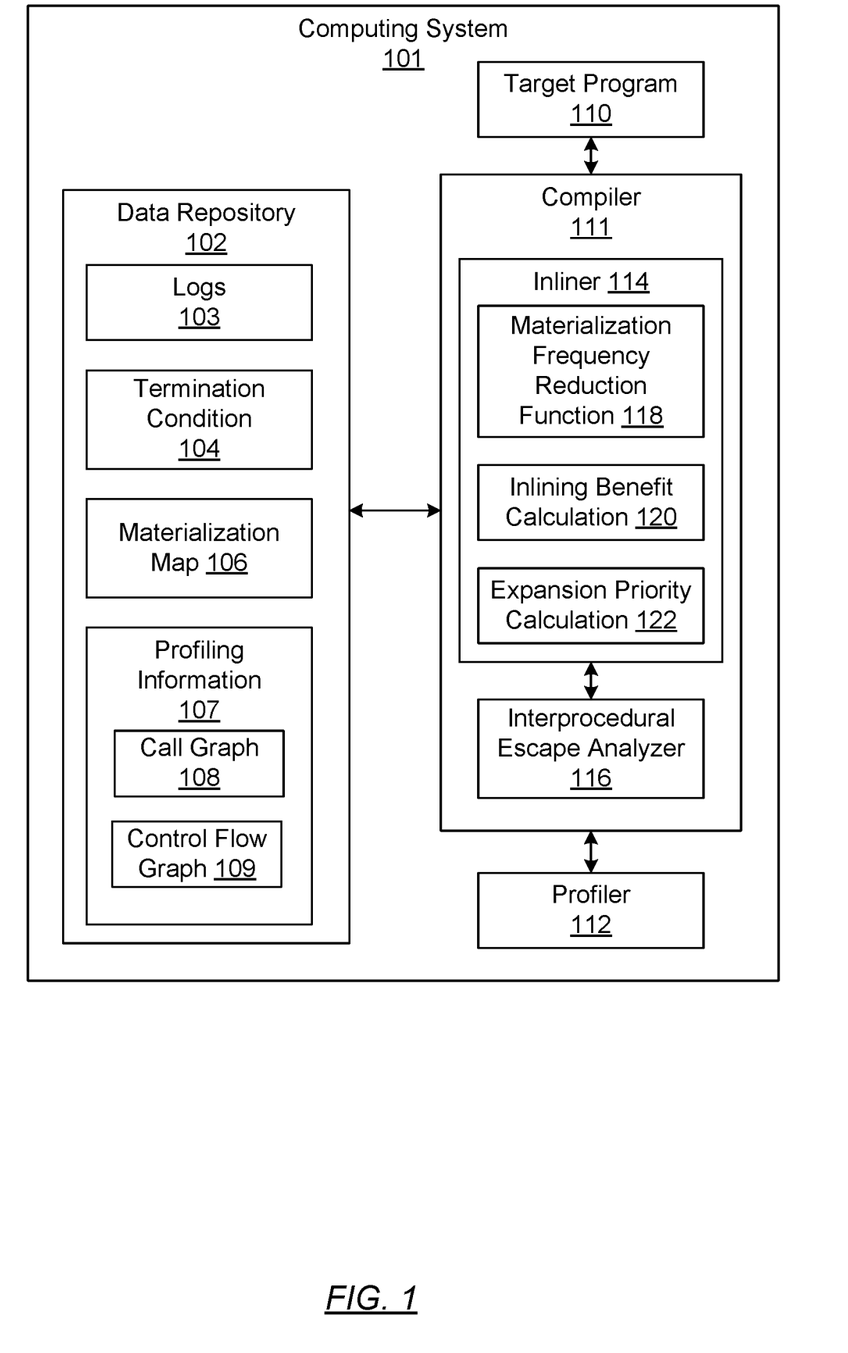
FIG. 1 shows a diagram of a system in accordance with one or more embodiments.

FIG. 1 shows a system in accordance with one or more embodiments of the invention. As shown in FIG. 1, the system is a computer system (101), such as the computer system shown in FIGS. 10A and 10B, and described below. The computer system (101) includes a target program (110) connected to the compiler (111), which invokes a profiler (112) and uses a data repository (102). The target program (110) is the program that is being compiled. Namely, the target program (110) is the target of performing compilation. The target program (110), before compilation by the technology, may be source code or an intermediate representation. The target program (110), after compilation, may be in machine code, byte code, or another representation.

The compiler (111) is a program that is configured to execute on the computer system (101) and transform the target program (110) to the bytecode or object code, or some other program representation. The profiler (112) dynamically analyzes the target program (110) and generates profiling information for the target program. The profiling information (107) may be used by the compiler (111). The profiling information (107) includes a call graph (108) (described below) and a control flow graph (109). The profiling information (107) indicates a projected number of executions, call frequencies, branch frequencies, type frequencies, information about code-size, and identification of other optimizations. For example, the profiling information (107) may include a node frequency value estimating a frequency that a call graph node is executed. The profiler (112) may be configured to perform a preliminary or projected execution of the program.

The compiler (111) is connected to a data repository (102). The data repository (102) is any type of storage unit and/or device (e.g., a file system, database, data structure, or any other storage mechanism) for storing data. Further, the data repository (102) may include multiple different, potentially heterogeneous, storage units and/or devices.

The data repository (102) may include logs (103), a termination condition (104), a materialization map (106), and profiling information (107). Within the profiling information (107) is the call graph (108) and a control flow graph (109). The call graph (108) is representing the relationship between subroutines (or methods) in the target program (110). The subroutine performing the call is referred to as a caller, and the subroutine being called is the callee. The location in the caller that includes the instruction for the call is the call site. A call graph (108) may be represented as a call tree whereby, for each call site, each subroutine is included as a separate call graph node. The control flow graph (109) is a representation, using graph notation, of the paths that might be traversed through a target program during the execution of the target program. Individual nodes in the control flow graph (109) correspond to one or more instructions of the target program. Thus, the control-flow graph represents the control flow between the instructions of the program. Nodes in the control flow graph may be associated with individual analysis information. The analysis information may include, for the corresponding instruction and for each object which has the instruction in its scope, whether the objects are virtualized or materialized.

The materialization map (106) is a mapping between the nodes (instructions) in the control-flow graph that maps from the original allocation of an object to all the locations at which the object is materialized. For example, the materialization map may include, for each object, an entry that identifies the control flow graph node corresponding to the instruction that allocates the object and the control flow graph node in which the object is determined to escape and should be materialized. In the materialization map, the object is not determined to escape at a call site unless the call site is to an unexplored node of the call graph.

The data repository (102) may also include a termination condition that specifies when to stop inlining and executing the IEA and logs of the compiling operations.

Returning to the compiler (111), the compiler (111) includes an inliner (114) and an interprocedural escape analyzer (116). The interprocedural escape analyzer (116) is configured to perform IEA as described in FIGS. 3 and 5. The IEA is configured to generate and update the materialization map (106).

The inliner (114) is configured to evaluate the cost and benefit of inlining a subroutine and performing an inlining operation. Inlining is the process of copying the callee code into the caller body at the callsite. Thus, the call is replaced with the code being called. To determine costs and benefits accounting for the IEA, the inliner includes a materialization frequency reduction function (118), an inlining benefit calculation (120), and an expansion priority calculation (122).

The materialization frequency reduction function (118) estimates, for a particular call site, a number of materializations that are removed by inlining a callee at the call site. For example, if the materialization map indicates that object in the caller remains virtualized in the callee, then the materialization frequency reduction function accounts for the removal of the materialization of the object if the callee is inlined.

The inlining benefit calculation (120) is a function that calculates an inlining benefit value for inlining the callee. The inlining benefit calculation uses the result of the materialization frequency reduction function. The inlining benefit calculation may include an initial inlining benefit that is boosted by the result of the material frequency reduction function.

The expansion priority calculation (122) is a function that calculates an expansion priority for expanding the call graph at a particular unexplored call node. The expansion priority calculation (122) uses the number of escaping objects that are virtual a the callsite and whether the callsite returns an object. In one or more embodiments, the expansion priority value weighs the priority of expansion differently for materializations based on objects escaping to unexplored called graph nodes. In some embodiments, the expansion priority calculation boost an initial expansion amount by the number of escaping objects.

Using the expansion priority calculation (122), the compiler (111) determines whether to expand the call graph. Specifically, the compiler (111) starts with a call graph consisting only of the root node (i.e. the compilation unit) and creates an expanded call graph. The expanded call graph is obtained by adding call graph nodes for callsites inside some nodes that are not yet associated with their own (i.e., the callsites' own) call graph nodes. In one or more embodiments, the compiler (111) then inlines, based on an analysis of the expanded call graph, one or more methods found within the target program (110) into a root method. The compiler (111) then performs an optimization operation in response to inlining the method. The compiler (111) then updates the expanded call graph based on the optimization operation to obtain an updated call graph. The following process may be repeated multiple times: the compiler (111) obtains an expanded call graph. Then, the compiler (111) inlines, based on an analysis of the expanded call graph, the method into the root method. If certain termination conditions are met, the compiler (111) completes compilation of the target program (110) by performing optimization operations including removing or delaying allocations of objects. Details of these steps are shown and discussed in relation to FIGS. 3-5. The operations of FIGS. 3-5 may be combined with each other and performed using the system described in FIGS. 1 and 2.

Figure 2:
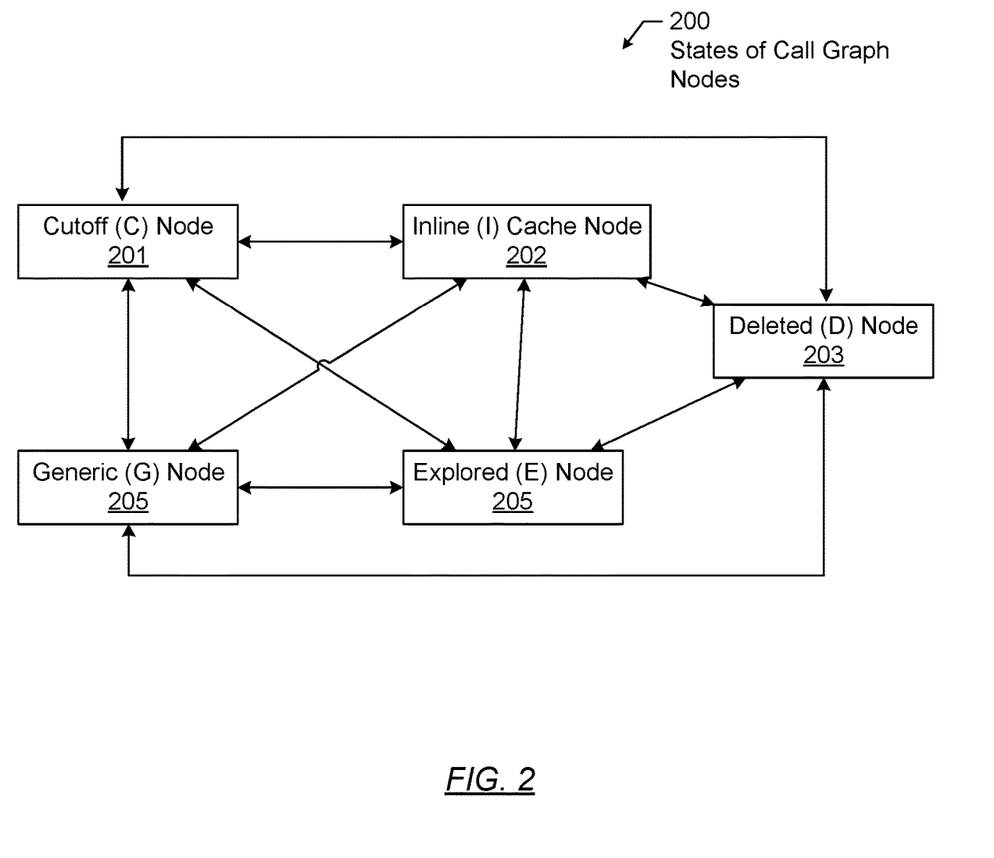
FIG. 2 shows a diagram of a call graph node state diagram in accordance with one or more embodiments.

As discussed above, the call graph initially is a root node. The call graph is iteratively expanded and inlining is performed. Thus, call graph nodes have different types and states. FIG. 2 shows the types and states of call graph nodes (200), which are elements of the call graph, used in this invention, including Cutoff (C) Node (201), Inline Cache (I) Node (202), Deleted (D) Node (203), Generic (G) Node (204), and Explored (E) Node (205). A Cutoff Node (201) represents a call to a subroutine whose body has not been explored. An Inline Cache Node (202) represents calls that can dispatch to multiple known target functions. A Deleted Node (203) represents a call-site that was originally in the intermediate representation, but was removed by an optimization. A Generic Node (204) represents a call to a function that will not be considered for inlining. An Explored Node (205) represents a call to a function whose body was explored. In one or more embodiments, the compiler evaluating methods of the target program uses the above-named nodes as part of the compiler's optimization.

While FIGS. 1 and 2 show a configuration of components, other configurations may be used without departing from the scope of the invention. For example, various components may be combined to create a single component. As another example, the functionality performed by a single component may be performed by two or more components.

Figure 3:
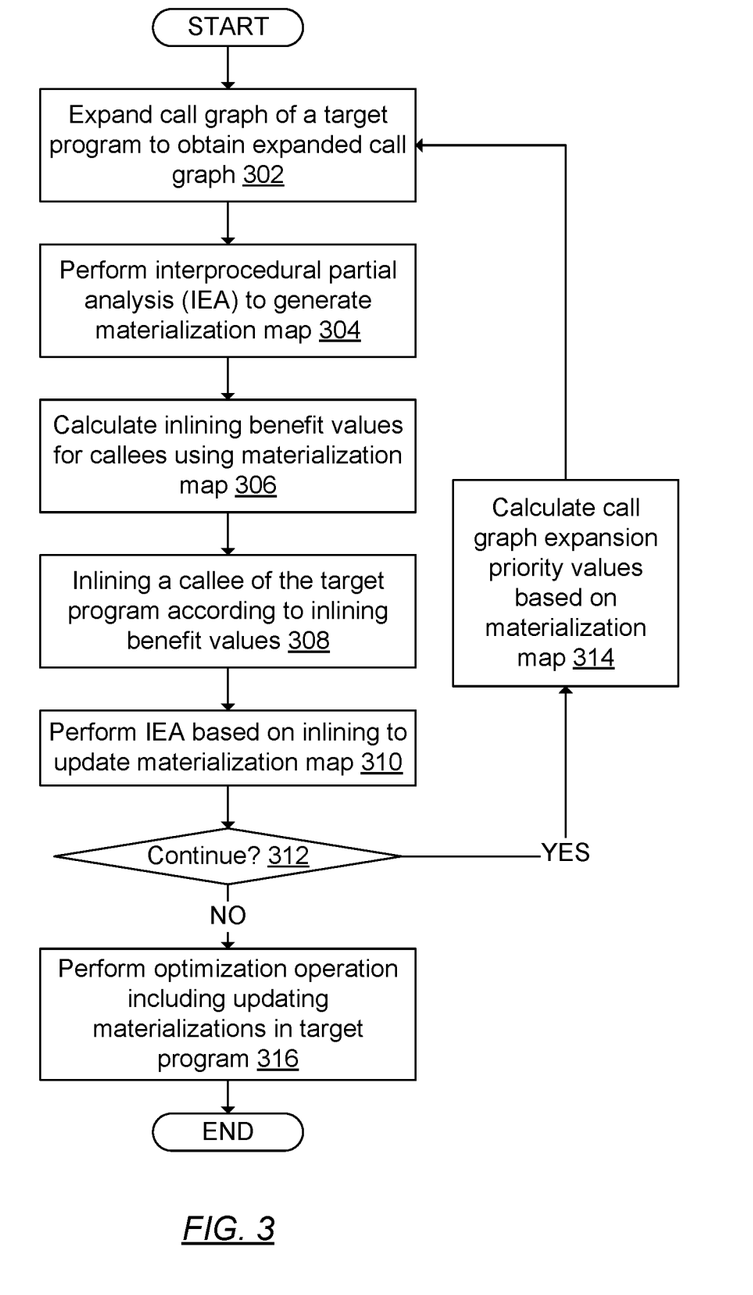
FIG. 3 shows a flowchart for improving program execution using interprocedural escape analysis with inlining in accordance with one or more embodiments.
Figure 4:
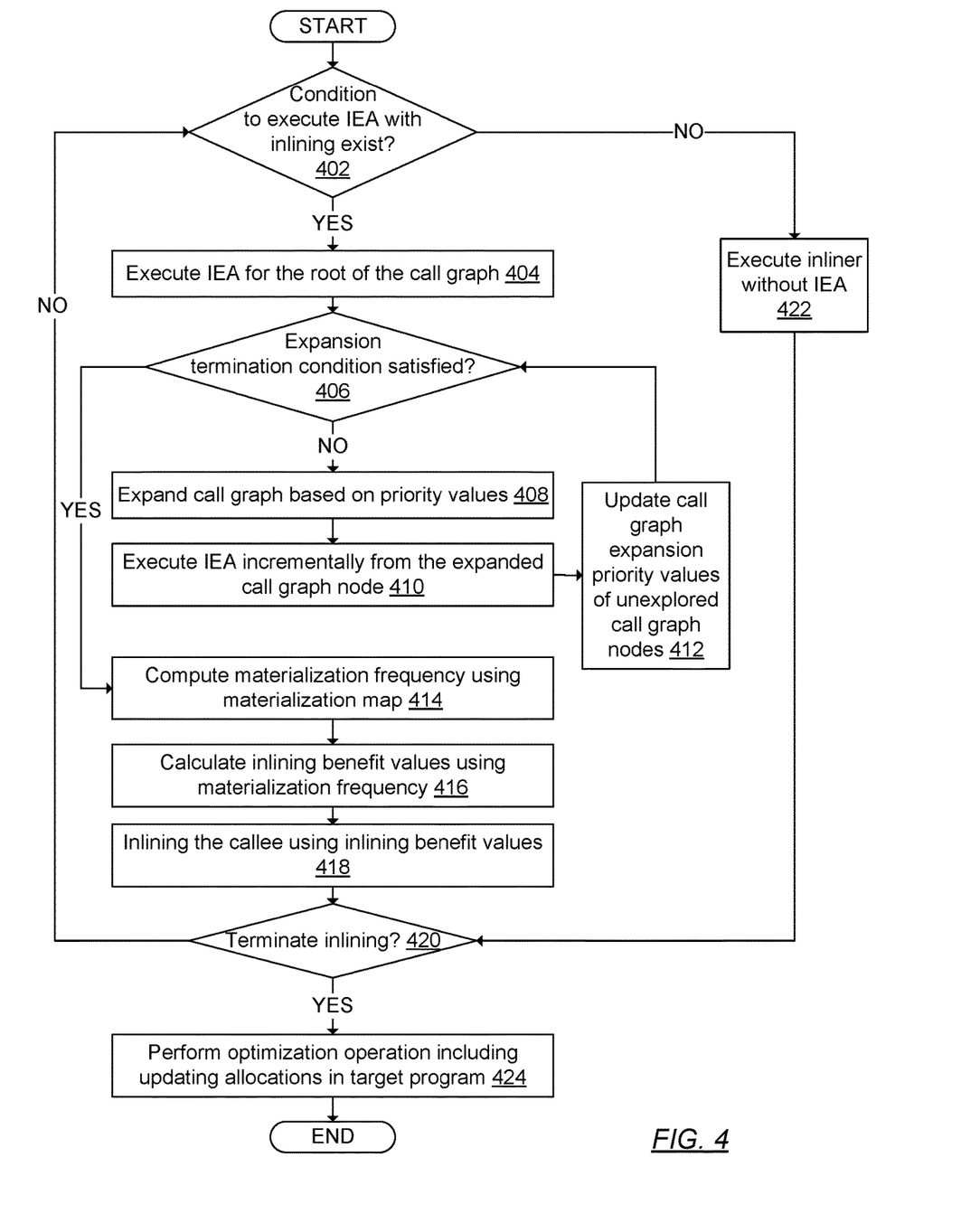
FIG. 4 shows a flowchart for inlining in accordance with one or more embodiments.
Figure 5:
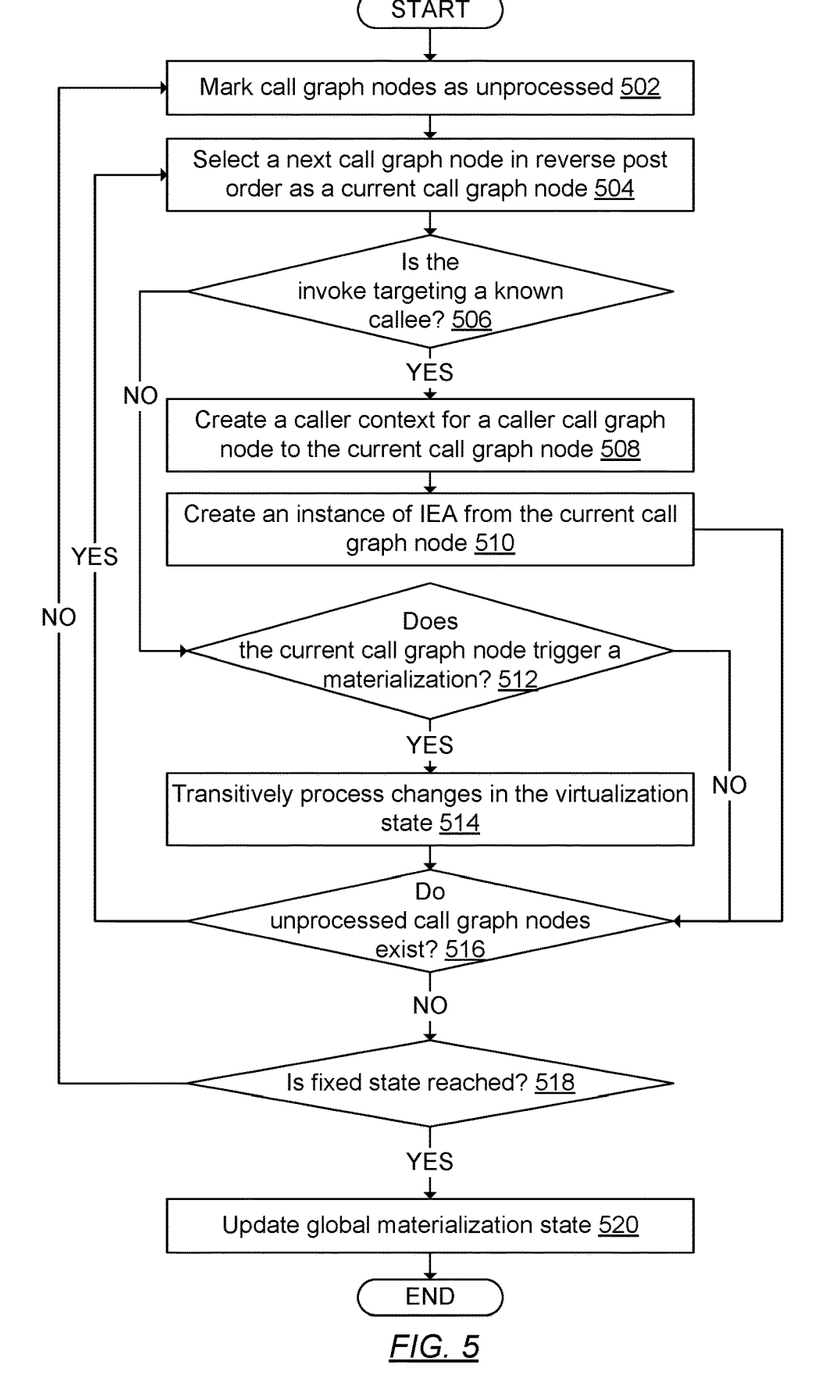
FIG. 5 shows a flowchart for interprocedural escape analysis in accordance with one or more embodiments.

FIGS. 3-5 show flowcharts in accordance with one or more embodiments. While the various steps in these flowchart are presented and described sequentially, at least some of the steps may be executed in different orders, may be combined or omitted, and at least some of the steps may be executed in parallel. Furthermore, the steps may be performed actively or passively.

Turning to FIG. 3, in Block 302, the call graph of the target program is expanded to obtain an expanded call graph. Initially, the call graph is the root node. Cutoff nodes are connected to the root node for each call site in the root node. Expanding the call graph is iteratively performed by exploring subroutines invoked at the call sites in the explored nodes. Thus, initially, the call sites considered are the call sites at the root node. For each call site, a cost benefit analysis of expanding the call graph by exploring the cutoff node for the callee (i.e., the subroutine being invoked) is performed. The cost benefit analysis assigns a call graph expansion priority value to expanding the call graph at the cutoff node. The expansion benefit priority value is a priority value that reflects both the costs of expanding the call graph at the call site and the benefit of expanding the call graph at the call site. The call graph is expanded by exploring the callee at the call site having the greatest expansion benefit priority value (i.e., the cutoff node with the greatest priority value). The process is repeated by adding a cutoff nodes for call sites in the callee to the call graph. More call graph expansion priority values are calculated for the cutoff nodes. The call graph expansion priority values for any cutoff nodes not explored are compared with each other to further expand the call graph.

In one or more embodiments, the expansion benefit priority value considers the materialization map. Objects that are virtualized at the call site, but materialize because of the call site increase the priority of expanding the call graph at the call site. Thus, if the objects escape because the cutoff node corresponding to the callee invoked at the call site is not explored, then exploring the cutoff node may cause the object to no longer escape and remain virtual. In other words, a possible inlining benefit exists by reducing allocations if the cutoff node is explored for the call site. In one or more embodiments, initial expansion benefit priority values are boosted by considering the materialization map. For example, the inliner may calculate initial expansion benefit priority values using standard techniques and then multiply or otherwise modify the initial expansion benefit priority values based on a value determined from a number of objects that escape because of being called by the callee.

The process of iteratively expanding the call graph continues until a termination condition is satisfied. For example, the termination condition may be based on the size of the call graph and/or a threshold on the call graph expansion priority values.

In Block 304, IEA is performed to generate a materialization map. Blocks 302 and 304 may be performed concurrently. Further, in some embodiments, the IEA and/or the regular escape analysis is partial escape analysis. In one or more embodiments, IEA is a modification of regular escape analysis that is intraprocedural. IEA processes specific nodes in the control-flow graph, namely the invoke, parameter and return nodes, differently compared to regular escape analysis. For other nodes, the regular escape analysis is performed. IEA tracks, for each object, the virtualization state of the object at each instruction. The virtualization state may be virtualized or materialized.

When an invoke node c(a0, . . . , aj) with arguments a0, . . . ,aj is encountered, the virtual object states of the arguments at the time of the invoke are used to initialize the virtual object states for the corresponding parameter nodes p0 . . . pj in the intermediate representation for the recursive analysis of the invoked callee. Namely, for any object in the callee's parameters, the virtualization state of the object is initially set to be the same as the virtualization state of the corresponding argument passed in the call. Accordingly, the same callee's parameter's virtualization state may be set to virtualized for one call site and materialized for a different call site. As shown, the escape analysis is interprocedural because the invoke node does not automatically cause the argument's virtualization state in the caller and parameter's virtualization states in the callee to be materialized. Rather, the virtualization state of objects is propagated from the caller to the callee.

In one or more embodiments, the callee is modified to include only a single unified return node. The return node values are merged into the single unified node that is used as the value result of the new unique return value. The type information of the single unified return node is recomputed based on the type information of the return nodes that are combined into the single unified return node. The virtualization state of the object being returned for the different return nodes is combined into virtualization state of the object of the single unified return node. In one or more embodiments, the combination may be a rule that if the object is materialized in any of the return nodes, then the object is materialized for the single unified return node.

Once a callee's escape analysis analysis is complete, the single unified return node's virtualization state is reflected back to the virtualization state of the object in the invoke node in the caller. Namely, as with the invoke node, the virtualization state of the object is propagated from the callee to the caller.

When returning from the nested analysis of the callee to the caller analysis, the parameter nodes' final virtualization states are reflected back to the caller analysis corresponding argument nodes. Thus, if materialization of a parameter node happened in the nested analysis, the corresponding argument node in the caller is set to materialized.

Thus, consider the scenario in which the invoke call is myinfo=bob.foo(A1, A2, A3), where foo is defined as foo (object P1, object P2, object P3). If A1 and A3 both have a virtualization state of virtualized at the call site of the caller, and A2 has a virtualization state of materialized at the call site of the caller, then P1 and P3 are initialized with the virtualization states of virtualized. Further, P2 is initialized with the virtualization state of materialized in the caller. If during execution of foo, the virtualization state of P3 is changed to materialized, then, on return, the virtualization state of A3 is changed to materialized. The virtualization state of A1 may remain the same if P1 is not materialized through any execution path of the execution of foo. If foo has two return nodes (e.g., through one execution path a first return instruction is executed and through another execution path a second return instruction is executed, such as because of a conditional instruction in foo), then if either returned object's virtualization state is materialized, then the virtualization state of myinfo is materialized. Otherwise, the virtualization state of myinfo may remain virtualized if previously virtualized in the caller.

The virtualization state of virtualized means that the object did not escape and the value of the object can be described by the values of the fields of that node. (E.g. a pair-like object that does not escape can be fully described by the value of its 1st and 2nd element; the value on the pair itself (i.e. its identity) is irrelevant as long as it does not escape). If the object does escape, then the virtualization state of the object is tagged as materialized starting at the location of the escape.

In one or more embodiments, for execution paths that separate into two or more branches, but then combine, if the object escapes at any branch, then the virtualization state of the object is marked as materialized for all branches. The virtualization state may be marked as materialized at the beginning of the branches. Further, once an object is materialized, the materialized virtualization state is propagated to later instructions. Stated another way, once the virtualization state of an object changes from virtualized to materialized, for later instructions for the object, the virtualization state is materialized.

The result of the IEA is the identification of the virtualization state of each object at each control flow graph node. Stated another way, each control flow graph node is related to information that identifies the virtualization states of objects at that control-flow graph node. In at least some embodiments, the virtualization states are for each object regardless of whether the object is identified in an instruction at the control flow graph node. From the virtualization states, the materialization map is generated. A separate entry is created in the materialization map for each object. The separate entry includes a call-graph-node identifier matching the location in which the instruction to allocate the object is defined and a set of call-graph-node identifiers matching the location to materialization points of the object. In other words, the escape analysis computes where the materializations should happen based on objects escaping, then IEA uses these materialization points. For example, if an object is initialized in a caller and then materialized based on an invoke to a callee, then the materialization map has, for the object, an entry that relates the call graph node identifier of the caller to the call graph node identifier of the callee. As another example, if an object is initialized in a caller, remains virtualized through call sites to first and second callees, but changes to materialized when used to invoke a third callee, then the materialization map has, for the object, an entry that relates the call graph node identifier of the caller to the call graph node identifier of the third callee. Notably, several different branches in which the object escapes may exist, or there might be no escaping branch, depending on the control flow of a particular program. Thus, the set of call-graph-node identifiers may be zero, one, or more than one.

In Block 306, inlining benefit values for callees are calculated using materialization map. An individual inlining benefit value is calculated for each callee. For the callee, the inlining benefit value reflects an amount of benefit that might be achieved by inlining the callee. One component of the inlining benefit value is the projected reduction in allocations if the callee were inlined. Specifically, if the materialization map indicates that the object is not materialized in the callee and has a virtualization state of virtualized when used in the callee, then inlining the callee means that the allocation of the object can be removed or delayed until after the call site to the callee. If the callee is not inlined, then the object is allocated prior to the invoke to the callee. Thus, the inlining benefit value is adjusted to reflect the reduction in allocations. One method of calculating the inlining benefit value is to determine an initial inlining benefit value that is based on other possible optimizations by inlining the callee. The initial inlining benefit value is boosted by a boost amount determined based on the materialization map to obtain the inlining benefit value.

In Block 308, a callee of the target program is inlined according to the inlining benefit values. Inlining may be performed using standard techniques. Inlining the callee copies the code of the callee into the same location as the call site. Through the inlining, certain optimizations may be performed, such as removing or reducing the allocation.

In Block 310, IEA is performed based on inlining to update the materialization map. The IEA may be performed as discussed above with reference to Block 304. In Block 310, the inlining of the callee may cause an update to the materialization map.

In Block 312, a determination is made whether to continue. The process of expanding the call graph and inlining is performed until a termination condition is satisfied. For example, the termination condition may be the size of the code, the processing time, or other termination condition. When the termination condition is satisfied, then the inlining with IEA may stop.

If a determination is made to continue, the flow proceeds to Block 314. In Block 314, call graph expansion priority values are calculated based on the materialization map. Calculating the call graph expansion priority values may be performed as discussed above with reference to Block 302.

If a determination is made not to continue, the flow proceeds to Block 316. In Block 316, an optimization operation is performed that includes updating allocations in the target program. With the inlining, the allocations of objects may be delayed or removed. If objects remain virtualized throughout the life of the object, then the allocation may be removed and the object is transformed into a field representation that may be stored in registers or on the stack. Other optimizations may also be performed based on inlining the object. The compilation then completes and the target program may be executed. Because of the inlining accounting for IEA, a reduction in the number of allocations may exist. Thus, the computer system may reduce the number of resources used to execute the target program.

FIGS. 4 and 5 show more detailed flowcharts of the flowchart shown in FIG. 3. One or more operations of FIGS. 4 and 5 may be an expanded form of corresponding operations in FIG. 3. FIG. 4 shows a flowchart for inlining in accordance with one or more embodiments. In Block 402, a determination is made whether the condition to execute IEA exists. For one or more of the inlining stages, a determination may be made to not perform inlining based on IEA. If the condition to execute IEA with inlining does not exist, the flow proceeds to Block 422. In Block 422, the inliner is executed without the IEA. For example, standard inlining may be performed that does not account for IEA.

Returning to Block 402, if the condition does exist to execute the inliner with the IEA, then the flow proceeds to Block 404. In Block 404, the IEA is executed for the root of the call graph. Executing the IEA is described in reference to FIG. 5 described below.

In Block 406, a determination is made whether an expansion termination condition is satisfied. From Block 402 to 406, the system enters the expansion stage.

If the expansion termination condition is not satisfied, the flow proceeds to Block 408. In Block 408, the call graph is expanded based on the priority values.

The expand function repetitively calls the 'descend and expand' subroutine until the policy returns "true" from the subroutine that checks whether the expansion is completed.

The expand policy subroutine ensures that the queue data structure of each node initially contains the children of that node, sorted by the priority P (i.e., the call graph expansion priority value). The priority can be computed as, but is not limited to, the value B/C, where B is the benefit of inlining that (and only that) specific node, and C is the code size increase resulting from inlining the node. The 'descend and expand' subroutine descends on one path in the call graph, by choosing a node with the highest priority, until reaching a cutoff node, and then expands that node. If the 'descend and expand' subroutine encounters an expanded node or an inline cache node, then the best child node is removed from the queue data structure, and the subroutine recursively calls itself for that child node. If the node returned from the recursive call is not null or has a non-empty queue, then the child node is placed back on the expansion queue of the current node. Before returning the current node, the update metric subroutine updates the metrics field. The metrics field contains various information about the relevant subtree of the call graph, including, but not limited to, total program size of all the call graph nodes in that subtree, or the number of cutoff nodes in that subtree. Otherwise, if the current node is a cutoff node (i.e. a leaf in the tree), then the expand subroutine is called on the policy object.

In one or more embodiments, the expand subroutine may return either null (indicating that the respective cutoff should not be considered in this round) or return a generic, expanded, or an inline cache node.

Further, the IEA is executed incrementally from the expanded call graph node in Block 410. Based on expansion of the call graph, more information about the call graph nodes may be explored. For example, the result of executing the IEA on the cutoff node when the cutoff node is explored is that some objects having a virtualization state of materialized beforehand may be changed to virtualized after exploration. Because of the propagation of the virtualization state described in reference to FIG. 3, the update of the virtualization state of an object may trigger an update of virtualization state of other objects or in other positions of the call graph. When executing the IEA, the materialization map may be updated based on the updated virtualization states.

In Block 412, the call graph expansion priority values of the unexplored call graph nodes are updated. Specifically, the call graph expansion priority values are calculated as described above in reference to FIG. 3 using the materialization map. Calculating the material frequency priority values may be performed using the following equation.

$$P(n) = P'(n) \cdot \delta_{eb} \cdot (1 + |\varepsilon(n)|) \qquad \text{eq. 1}$$

In eq. 1, P(n) is the call graph expansion priority value for cutoff node n, P'(n) is an initial call graph expansion priority value for cutoff node n using standard methods, $\delta_{eb}$ is an escape boost, and $\varepsilon(n)$ is the number of allocations that escape into the cutoff node n. Specifically, $\delta_{eb}$ is a constant. The $\varepsilon(n)$ is the maximum number of allocations that might be avoided if the call graph is expanded at node n. Using the maximum number of allocations as $\varepsilon(n)$ is an optimistic approach as some materializations may exist even after expanding the call graph. Thus, other statistics for $\varepsilon(n)$ may be used.

Returning to Block 406, if the expansion termination condition is satisfied, the flow proceeds to Block 414. In Block 414, the materialization frequency reduction is computed using the materialization map. Materialization frequency reduction value for an object is a number of materializations that may be avoided by inlining the callee. Materialization frequency reduction may be calculated using equation eq 2 below.

$$FR(a) = \frac{F(a) - \sum_m F(m)}{F(a)} \qquad \text{eq. 2}$$

In equation eq. 2, FR(a) is the materialization frequency reduction value for an allocation node a. F(a) is the frequency of allocating the object at the allocation node (i.e., instruction) a. For each instruction, the profiler estimates the frequency of execution and the information is stored in the control flow graph. Thus, F(a) is determined from the profiler for each instruction and is the known frequency of allocations of object a. F(m) is the frequency of the node m in the control flow graph, where the node m causes a materialization of object allocated at the corresponding allocation node a. If multiple branches of the control flow graph cause a materialization of object a, then the sum of the branches is used. In equation eq. 2, dividing by F (a) results in a normalized value between 0 and 1. A material frequency reduction value of 0 indicates that little to no benefit is achieved by inlining all the subroutines to virtualize the object allocated at the allocation node a. As the material frequency reduction value gets closer to 1, more inlining benefit for allocations occurs. For example, materialization frequency reduction value of 1 indicates that if the callee is inlined, then no allocations need to occur for object a.

In some embodiments, other operations are also considered besides allocations. For example, while F(m) considers frequency of materializations, the reads and writes to the object may also be considered.

Equation eq. 2 may be modified in some embodiments to calculate an material frequency reduction value that accounts for objects that escape to cutoff nodes. Equation eq. 3 shows a modified version of eq. 2.

$$FR(a) = \frac{F(a) - \sum_m \phi_m F(m)}{F(a)} \qquad \text{eq. 3}$$

In eq. 3, $\phi_m$ is a constant $\delta_{cw}$, which is less than 1 if the materialization is because the object escapes to a cutoff node, and 1 otherwise. Thus, the alternative version changes the materialization frequency reduction value when the materialization only occurs because the object escapes to a cutoff node.

The material frequency reduction value may be calculated for each object and each call graph node of the call graph that is a candidate for being inlined.

In Block 416, inlining benefit values are calculated using the materialization frequency. The inlining benefit values use the materialization frequency reduction values. In one or more embodiments, the inlining benefit values are calculated using equation eq. 4.

$$B(c_{a0,...,aj}) = B'(c_{a0,...,aj}) \cdot \max_{i \in 0,...,j} (\delta_{mb})^{FR(a_i)} \qquad \text{eq. 4}$$

In eq. 1, $B(c_{a0, ..., aj})$ is the call graph node benefit value across objects a0, . . . , aj call graph node n, $B'(c_{a0, ..., aj})$ is an initial call graph node benefit value for call graph node n using standard methods, $\delta_{mb}$ is a boost that is a constant, and $FR(a_i)$ is the materialization frequency reduction value for object $a_i$. As shown in equation eq. 4, the amount of the boost is determined from the maximum frequency number of reductions across the objects in call graph node n. As shown the inlining benefit value is boosted based on the material frequency reduction value. Although FIG. 4 shows one function, other functions may be used to boost or otherwise increase the benefit based on the materialization-frequency reduction function FR.

In Block 418, the callee is inlined using the inlining benefit values. The callee having the greatest benefit value is inlined. Inlining may be performed as discussed above with reference to FIG. 3.

In Block 420, a determination is made whether to terminate the inlining. If the determination is made to not terminate inlining, the flow proceeds to Block 402 where the process described in FIG. 4 is repeated. If the determination is made to terminate inlining, the flow proceeds to Block 424.

In Block 424, one or more optimization operations are performed. The optimization operations include updating allocations in the target program. Allocations may be delayed to less frequently executed instruction locations or removed by the compiler.

Compilation of the target program completes and the program is transformed to machine code or byte code. The target program may be deployed to a computer system and executed. When executed, because of the inlining accounting for the IEA and the updating to the allocations, fewer memory allocations for objects are performed. Specifically, inlining subroutines that cause or are the cause of objects escaping means that those escaping objects can now have delayed or removed allocations. If those subroutines were not inlined, then the allocations would need to be performed prior to the subroutines being called. Thus, embodiments cause fewer or delayed allocations. With the fewer memory allocations, garbage collection is lessened and the target program may execute faster.

FIG. 5 shows a flowchart for IEA in accordance with one or more embodiments. In Block 502, the call graph nodes are marked as unprocessed. The call graph nodes are related to a not processed identifier.

In Block 504, the next call graph node in reverse post order is selected as the current call graph node. Reverse post order visits each node in reverse, whereby child nodes or processed before parent nodes. Later child nodes are processed first.

In Block 506, a determination is made whether the invoke is targeting a known callee. If the determination is made that the invoke is targeting a known callee, the flow proceeds to Block 508. The invoke is the invoke to the current call graph node.

In Block 508, a caller context is created for the caller call graph node. The caller context includes the arguments used to call the callee and the virtualization state of the objects.

In Block 510, an instance of the IEA is created from the current call graph node. In one or more embodiments, FIG. 5 is recursively performed. Thus, Block 510 causes a new performance of FIG. 5 for the current call graph node. Upon returning from recursive performance of FIG. 5 for the current call graph node, the flow proceeds to Block 516.

Returning to Block 506, if the invoke is not targeting a known callee, the flow proceeds to Block 512. In Block 512, a determination is made whether the current call graph node triggers a materialization. Determining whether the current call graph node triggers a materialization may be performed as discussed above with reference to FIG. 3. If a determination is made that the current call graph node does not trigger a materialization, the flow proceeds to Block 516.

If the current call graph node triggers a materialization, the changes in the virtualization state is transitively processed based on the materialization in Block 514. When the virtualization state is processed in the callee, updates to the virtualization states may be triggered in the caller as explained above. Thus, the virtualization states are updated throughout the control flow graph. The flow proceeds to Block 516.

In Block 516, a determination is made whether unprocessed call graph nodes exist. If unprocessed call graph nodes exist, the process of FIG. 5 repeats with Block 504. If unprocessed call graph nodes do not exist, the flow proceeds to Block 518.

In Block 518, a determination is made whether a fixed state is reached. The fixed state is when materializations are determined for the call graph and the call graph is not further expanded. If the fixed state is not reached, the flow returns to Block 502.

If a fixed state is reached in Block 518, the flow proceeds to Block 520. In Block 520, the global materialization state is updated. The global materialization state is the materializations listed in the materialization map.

The following example is for explanatory purposes only and not intended to limit the scope of the invention. FIGS. 6-9 show an example for performing the techniques described in FIGS. 1-5.

Figures 6, 7:
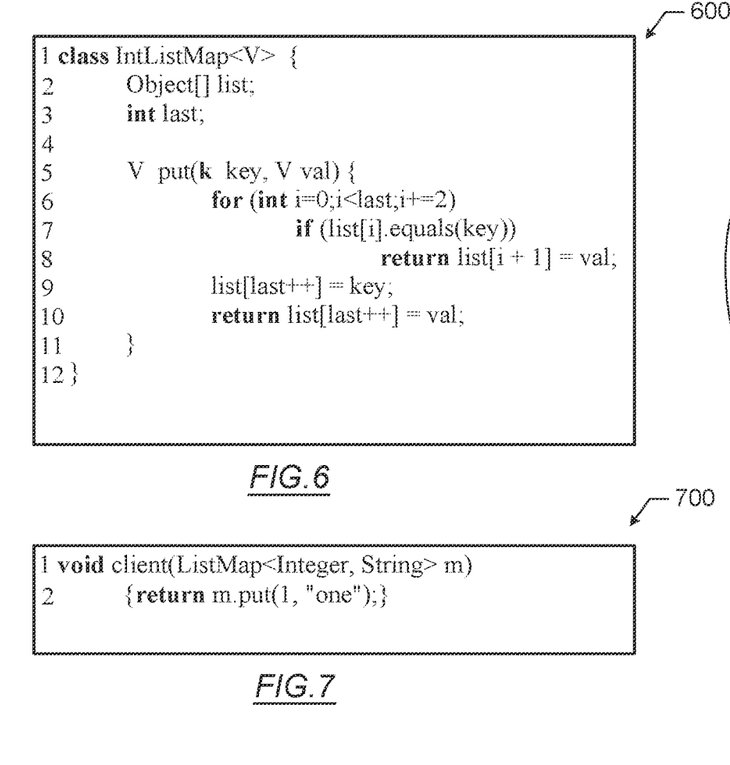
FIGS. 6, 7, 8, and 9 show an example in accordance with one or more embodiments.

FIG. 6 shows an example of a put method (600). The key parameter has type k. The key is boxed at put's call site before put is event called. Thus, whenever put is called the allocation of key occurs. Consider the client code of FIG. 7. FIG. 7 shows an example of a client method (700) that calls the put method in FIG. 6. In FIG. 7, the client code calls put with an integer. Because the general escape analysis is intraprocedural, the allocation of key would still occurs unless the inliner inlined the put method for other reasons. Specifically, if the put method is inlined, then key could remain unallocated and not transformed to an object.

Figure 8:
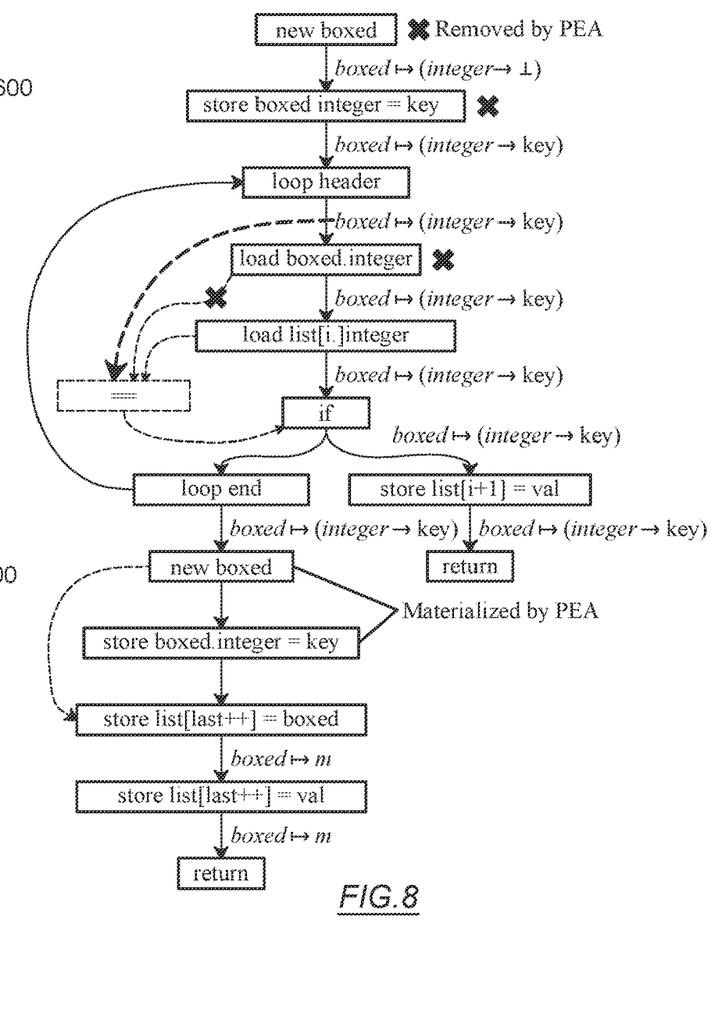

FIG. 8 shows an example control flow and data flow graph of put (800). The classical escape analysis algorithm would move the boxed parameter to the latest point in the allocation of put. However, escape analysis does not see the allocation of the object at its callsite, so escape analysis is only applicable if put gets inlined into the client subroutine. Thus, the escape analysis does not cause a boost for inlining the put method of FIG. 6 into FIG. 7, because escape analysis is callsite-agnostic.

Figure 9:
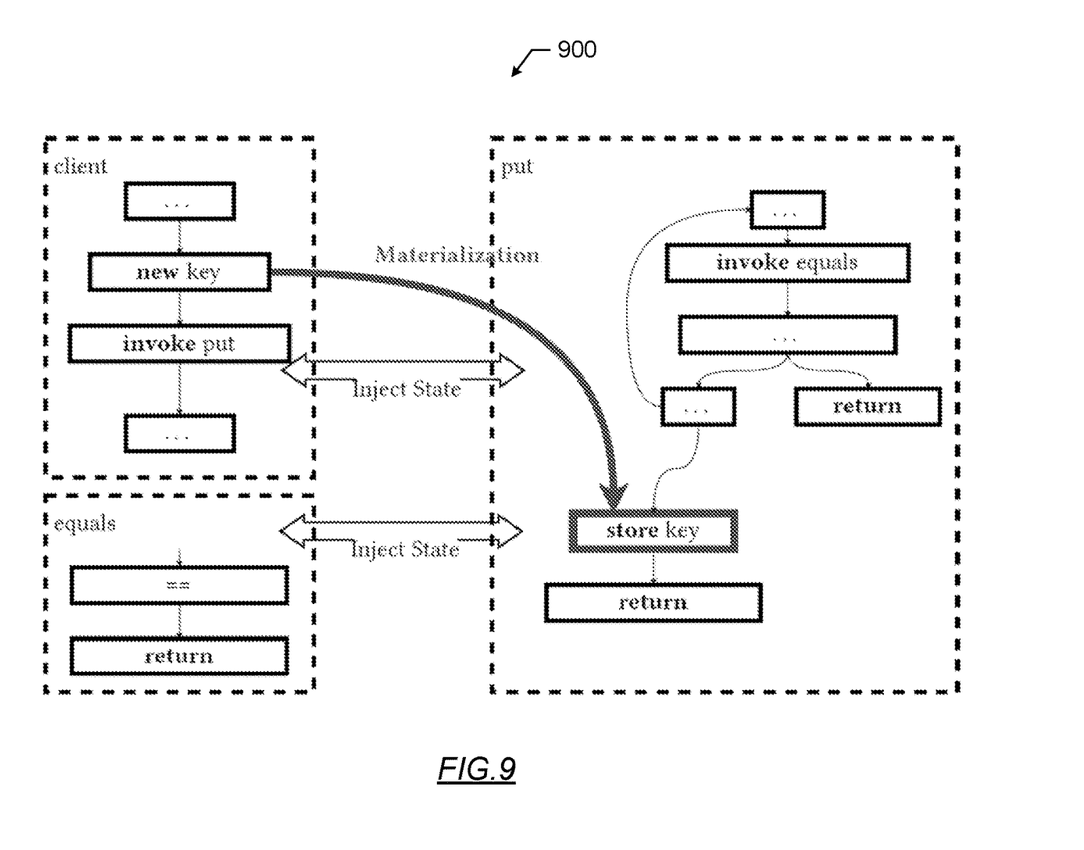

FIG. 9 shows an example of the call graph (900) of the client code to put that is considered by IEA. Under IEA, key is not automatically materialized when put is called. Rather, key is materialized at the store of key. If the conditional expression is infrequently satisfied, then key is not often stored causing a reduction in materializations of key. Thus, key may remain virtual and just stored in registers as an integer. The IEA boosts the inlining of the put method based on the later materialization of key to cause a reduction in the allocations of key.

By boosting the inlining based on IEA, one or more embodiments improve the execution of the computer system.

Figure 10A:
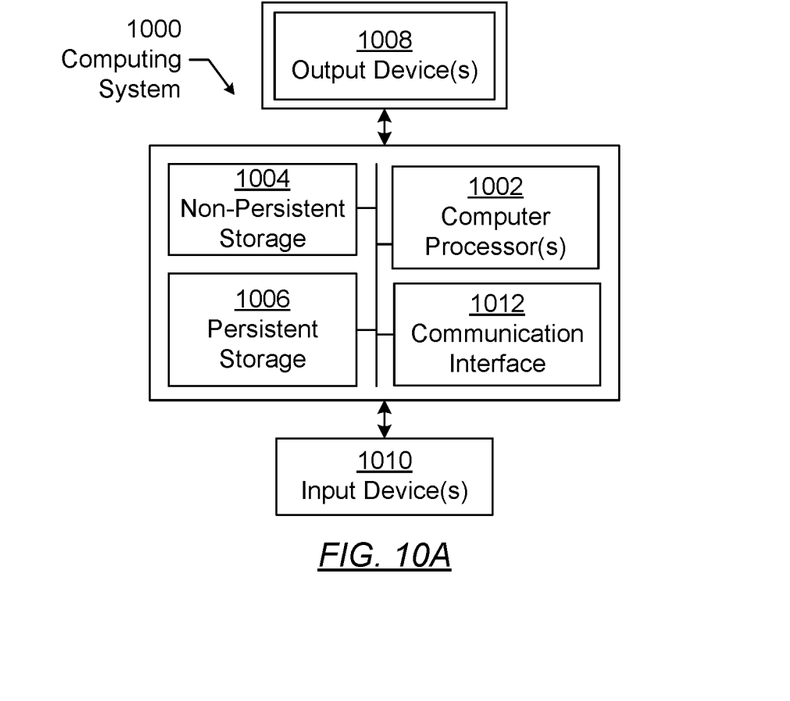
FIGS. 10A and 10B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processors (1002), non-persistent storage (1004), persistent storage (1006), a communication interface (1012) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) (1002) may be one or more cores or micro-cores of a processor. The computer processor(s) (1002) includes one or more processors. The one or more processors may include a central processing unit (CPU), a graphics processing unit (GPU), a tensor processing units (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1008). The inputs may include text input, audio input, video input, etc., which may be processed and transmitted by the computing system (1000) in accordance with the disclosure. The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1008) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1008) may display data and messages that are transmitted and received by the computing system (1000). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 10B:
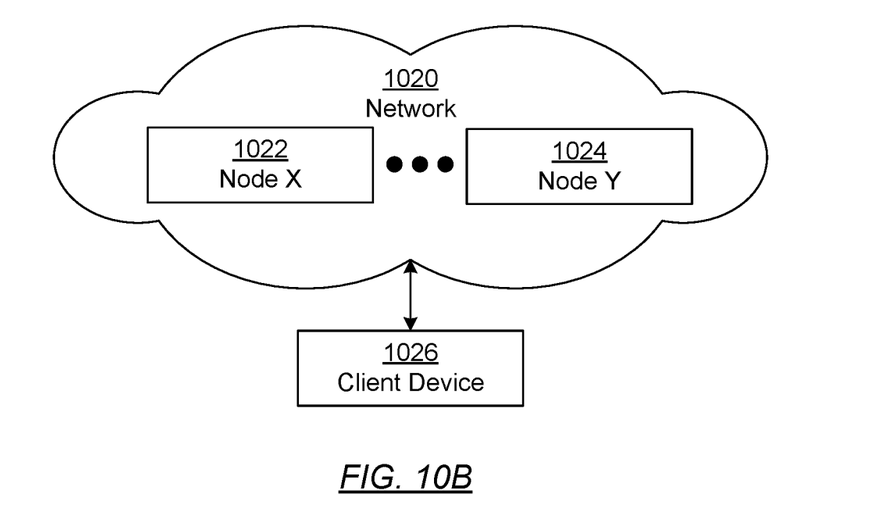

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    expanding a call graph of a target program to obtain an expanded call graph;
    performing, using the expanded call graph, an interprocedural escape analysis (IEA) to generate a materialization map;
    calculating an inlining benefit value for a callee using the materialization map;
    inlining, using the expanded call graph and in the target program, the callee according to the inlining benefit value;
    updating, after inlining the callee, an allocation in the target program; and
    completing, after updating the allocation, compilation of the target program.

2. The method of claim 1, further comprising:
    performing, after performing the inlining, the IEA to update the materialization map; and
    performing an additional inlining operation using the materialization map after updating the materialization map.

3. The method of claim 1, further comprising:
    calculating a call graph expansion priority value based on the materialization map; and
    further expanding the call graph according to the call graph expansion priority value.

4. The method of claim 3, wherein the call graph expansion priority value is based on a number of object allocations that escape into cutoff nodes of the call graph.

5. The method of claim 1, wherein expanding the call graph comprises:
    executing IEA for a root of the call graph, and
    until an expansion termination condition is satisfied:
        expanding the call graph according to a plurality of call graph expansion priority values determined from the materialization map,
        executing the IEA incrementally from an expanded call graph node of the call graph to update the materialization map, and
        updating the plurality of call graph expansion priority values.

6. The method of claim 1, wherein calculating the inlining benefit value for the callee using the materialization map comprises:
    computing a materialization frequency for the callee using the materialization map, and
    calculating the inlining benefit value for the callee using the materialization frequency.

7. The method of claim 1, wherein performing IEA comprising:
    selecting, as a current call graph node, a next call graph node of a plurality of call graph nodes of the call graph;
    creating a caller context for a caller to the current call graph node; and
    creating an instance of the IEA starting from the current call graph node.

8. The method of claim 7, further comprising:
    marking the plurality of call graph nodes of the call graph as unprocessed; and
    until the plurality of call graph nodes are marked as processed, recursively performing the IEA on the plurality of call graph nodes.

9. The method of claim 7, wherein performing the IEA comprising:
    transitively processing a change in a virtualization state of the current call graph node in the call graph when the call graph node triggers a materialization.

10. The method of claim 9, further comprising:
    generating the materialization map using the virtualization state of the plurality of call graph nodes.

11. The method of claim 7, wherein the selecting is performed in reverse post order.

12. The method of claim 1, wherein the materialization map maps, for each of a plurality of objects, a location of the allocation of the object to a location of materialization of the object.

13. The method of claim 1, wherein calculating the inlining benefit value for the callee using the materialization map comprises:
    determining an initial inlining benefit value; and
    boosting the initial inlining benefit value by a boost amount determined using a materialization frequency reduction value determined from the materialization map to obtain the inlining benefit value.

14. The method of claim 13, wherein the materialization frequency reduction value represents a reduction in materializations caused by inlining the callee.

15. A system comprising
    a data repository storing a call graph of a target program; and
    a computer processor comprising instructions for a compiler to perform operations, the operations comprising:
        expanding the call graph of the target program to obtain an expanded call graph;
        performing, using the expanded call graph, an interprocedural escape analysis (IEA) to generate a materialization map;
        calculating an inlining benefit value for a callee using the materialization map;
        inlining, using the expanded call graph and in the target program, the callee according to the inlining benefit value;
        updating, after inlining the callee, an allocation in the target program; and
        completing, after updating the allocation, compilation of the target program.

16. The system of claim 15, wherein the operations further comprise:
    performing, after performing the inlining, the IEA to update the materialization map; and
    performing an additional inlining operation using the materialization map after updating the materialization map.

17. The system of claim 15, wherein the operations further comprise:
    calculating a call graph expansion priority value based on the materialization map; and
    further expanding the call graph according to the call graph expansion priority value.

18. The system of claim 17, wherein the call graph expansion priority value is based on a number of object allocations that escape into cutoff nodes of the call graph.

19. A non-transitory computer readable program medium comprising instructions for causing a computer system to perform operations, the operations comprising:
    expanding a call graph of a target program to obtain an expanded call graph;
    performing, using the expanded call graph, an interprocedural escape analysis (IEA) to generate a materialization map;
    calculating an inlining benefit value for a callee using the materialization map;
    inlining, using the expanded call graph and in the target program, the callee according to the inlining benefit value;
    updating, after inlining the callee, an allocation in the target program; and
    completing, after updating the allocation, compilation of the target program.

20. The non-transitory computer readable program medium of claim 19, wherein the operations further comprise:
    performing, after performing the inlining, the IEA to update the materialization map; and
    performing an additional inlining operation using the materialization map after updating the materialization map.

* * * * *